US007975823B2

(12) United States Patent
Min

(10) Patent No.: US 7,975,823 B2
(45) Date of Patent: Jul. 12, 2011

(54) CLUTCH AND REVERSE-LOCKING DEVICE

(76) Inventor: Yu Min, Hong Kong (CN)

( * ) Notice: Subject to any disclaimer, the term of this patent is extended or adjusted under 35 U.S.C. 154(b) by 740 days.

(21) Appl. No.: 11/878,072

(22) Filed: Jul. 20, 2007

(65) Prior Publication Data

US 2008/0017466 A1 Jan. 24, 2008

(30) Foreign Application Priority Data

Jul. 21, 2006 (CN) ...................... 2006 2 0062147 U

(51) Int. Cl.
*F16D 11/16* (2006.01)
*F16D 27/00* (2006.01)

(52) U.S. Cl. ......................... 192/71; 192/84.6; 192/84.8

(58) Field of Classification Search .................... 192/39; 70/218, 222, 472
See application file for complete search history.

(56) References Cited

U.S. PATENT DOCUMENTS 3,896,644 A * 7/1975 Nagy et al. ...................... 70/222
4,848,547 A * 7/1989 Kampf ............................ 192/71

* cited by examiner

*Primary Examiner* — Rodney H Bonck
(74) *Attorney, Agent, or Firm* — Jacobson Holman PLLC

(57) ABSTRACT

The present invention discloses a clutch and reverse-locking device comprising a stop bolt (1), an internal clutch stem (2), a clutch control member (3), a clutch casing (4) and a stopper (5). The internal clutch stem (2) is inserted into the clutch casing (4) and they move independently of each other. The internal clutch stem (2) has a slot (21) to house and guide the stop bolt (1). The clutch control member (3) is installed in the internal clutch stem (2) and has an edge (42) set against the groove (11) of the stop bolt (1). The stopper (5) is fitted in the internal clutch stem (2) and protrudes partially outward therefrom. The protruding or non-protruding position of the stop bolt (1) in the internal clutch stem (2) correlates or disconnects the joint movement of the clutch casing (4) and the internal clutch stem (2), activating or deactivating the clutch operation of the clutch device. Being driven by the clutch casing (4), the stopper (5) moves the internal clutch stem (2) in tandem, to achieve the reverse-locking function.

1 Claim, 4 Drawing Sheets

CLUTCH AND REVERSE-LOCKING DEVICE

FIELD OF THE INVENTION

The present invention relates to a lock component, in particular, a clutch and reverse-locking device.

BACKGROUND OF THE INVENTION

Current clutch devices are mostly mono-functional. The present invention integrates a clutch with a reverse-locking device.

SUMMARY OF THE INVENTION

It is an object of the present invention to provide a clutch and reverse-locking device which, based on the operation of a simple-structured mechanism, integrates the clutching function with the reverse-locking function. The device of the present invention is simple in structure, easy to use and cheap to produce.

It is a further object of the present invention to provide a clutch and reverse-locking device comprising a stop bolt (1), an internal clutch stem (2), a clutch control member (3), a clutch casing (4) and a stopper (5). The internal clutch stem (2) is inserted into the clutch casing (4). The internal clutch stem (2) and the clutch casing (4) are separated and they move independently of each other. The internal clutch stem (2) has a slot (21) to house and guide the stop bolt (1). The clutch control member (3) is installed in the internal clutch stem (2) and has an edge (42) set against a groove (11) of the stop bolt (1). The stopper (5) is fitted in the internal clutch stem (2) and protrudes partially therefrom. In addition, a transmission sleeve (41) in the clutch control member (3) can slide in its axial direction and it is confined and guided by the clutch control member (3).

During operation, the protruding or non-protruding position of the stop bolt (1) in the internal clutch stem (2) correlates or disconnects the joint movement of the clutch casing (4) and the internal clutch stem (2), to activate or deactivate the clutching operation of the clutch device. Being driven by the clutch casing (4), the stopper (5) moves the internal clutch stem (2) to achieve the reverse-locking function.

DETAILED DESCRIPTION OF THE INVENTION

Figure 1:
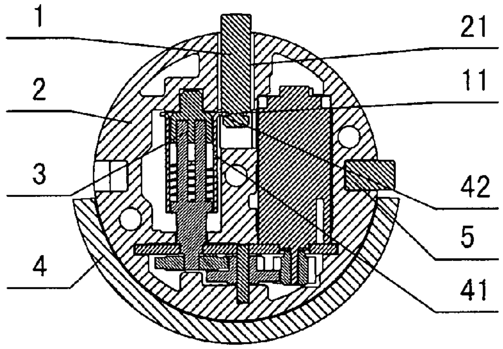
FIG. 1 is a structural diagram of a clutch and reverse-locking device of the present invention for a right-open door.

The clutch and reverse-locking device as described in FIG. 1 is for a right-open door. With reference to the clutch and reverse-locking device for a right-open door as an example, and as well as the drawings and operation examples, this device of the present invention is further explained in detail as follows:

The clutch and reverse-locking device comprises a stop bolt (1), an internal clutch stem (2), a clutch control member (3), a clutch casing (4) and a stopper (5). The internal clutch stem (2) is inserted into the clutch casing (4). The internal clutch stem (2) and the clutch casing (4) are separated and move independently of each other. The internal clutch stem (2) has a slot (21) to house and guide the stop bolt (1). The clutch control member (3) is installed in the internal clutch stem (2) and has an edge (42) set against the groove (11) of the stop bolt (1). The stopper (5) is fitted in the internal clutch stem (2) and protrudes partially and outward therefrom.

A transmission sleeve (41) in the clutch control member (3), as described above, can slide in its axial direction. The transmission sleeve (41) is confined and guided by a position-limiting member of the clutch control member (3). The combination of the transmission sleeve (41) and the clutch control member (3) is the same device as disclosed in the same inventor's co-pending U.S. patent application entitled "A drive mechanism for a lock" filed Jul. 20, 2007 (claiming the benefit of the Chinese Application No. 200620062146.x, filed Jul. 21, 2006) and the entire disclosure of the co-pending U.S. patent application is incorporated by reference herewith.

Figure 3:
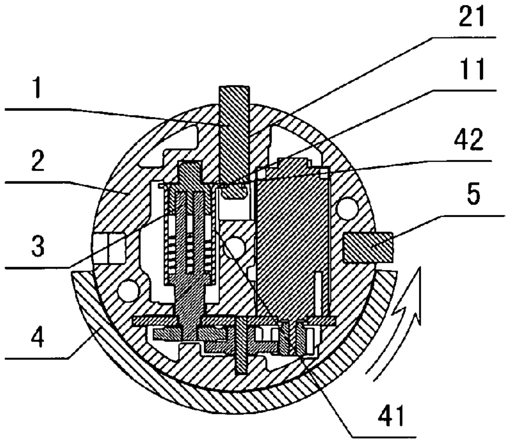
FIG. 3 is a structural diagram of the device in its initial position.
Figure 4:
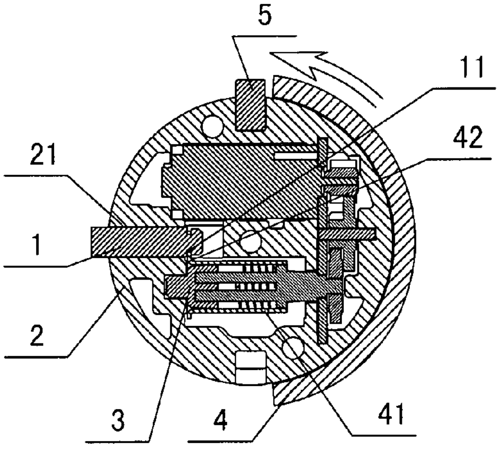
FIG. 4 is a structural diagram of the device in its reverse-locking position.

As shown in FIG. 3, being driven by the clutch casing (4), the stopper (5) moves the internal clutch stem (2) counter clockwise to the reverse-locking position as shown in FIG. 4. While the internal clutch stem (2) stays in the reverse-locking position, the clutch casing (4) turns clockwise to reset itself in the initial position as shown in FIG. 5, activating the reverse-lock in a reverse turn.

Figure 6:
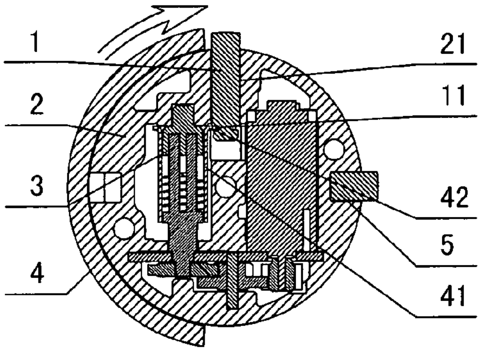
FIG. 6 is a schematic diagram of the clutch in activation to unlock.
Figure 7:
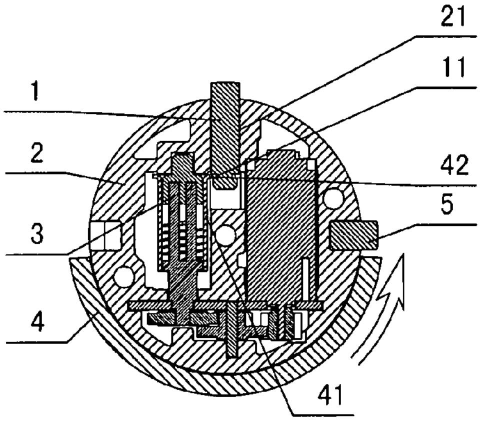
FIG. 7 is a schematic diagram of the clutch in activation to reset.
Figure 8:
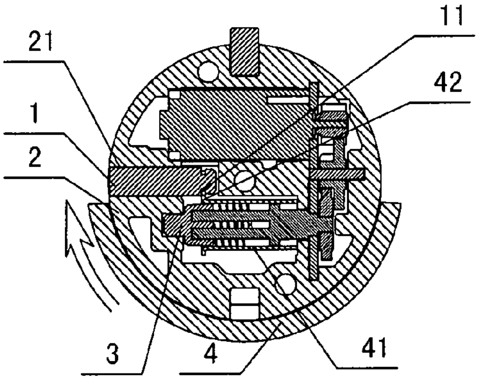
FIG. 8 is a schematic diagram of the reverse-locking device in resetting and the clutch in deactivation.

From a position shown in FIG. 8, when the transmission sleeve (41) in the clutch control member (3) slides to the left in an axial direction, the edge (42) of the clutch control member (3) pushes the stop bolt (1) outward. Confined and guided by the clutch control member (3), the stop bolt (1) protrudes from the internal clutch stem (2) to a position shown in FIG. 5. Being driven by the clutch casing (4), the stop bolt (1) moves the internal clutch stem (2) clockwise to the unlocking position shown in FIG. 6. Then while the internal clutch stem (2) stays in the unlocking position, the clutch casing (4) turns counter-clockwise to reset itself in the initial position, activating the clutch to unlock, as shown in FIG. 7.

Figure 5:
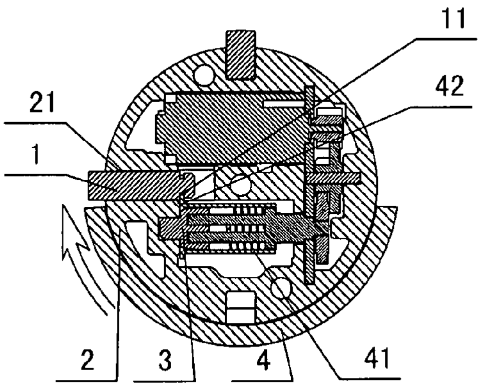
FIG. 5 is a schematic diagram of the reverse-locking device in resetting and the clutch in activation.
Figure 9:
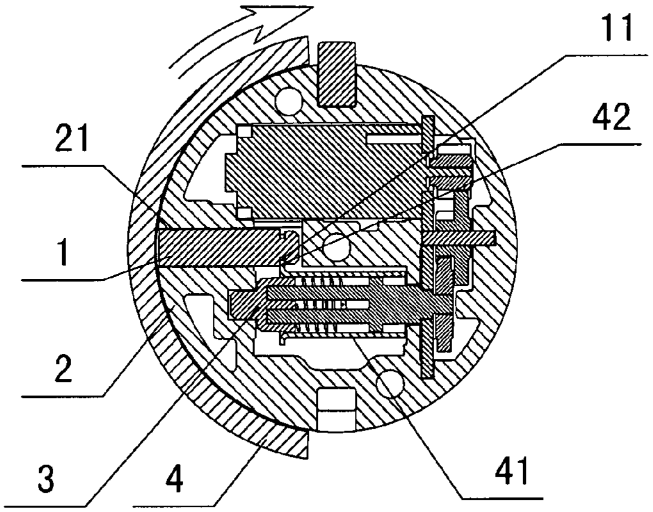
FIG. 9 is a schematic diagram of the clutch in deactivation and an idle turn to lock.
Figure 10:
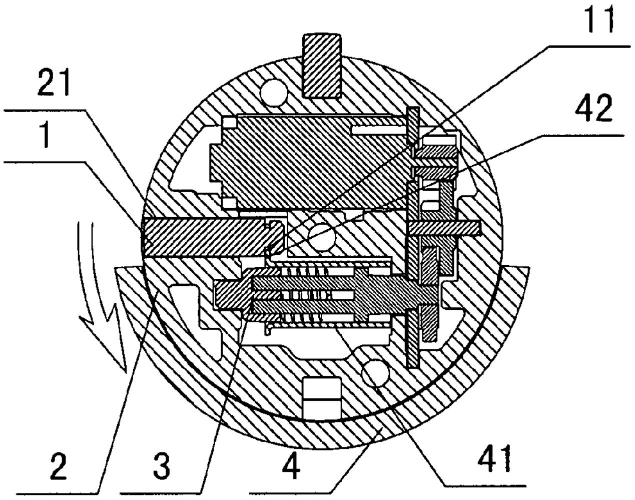
FIG. 10 is a schematic diagram of the clutch in deactivation to reset.

From the position described in FIG. 5, when the transmission sleeve (41) in the clutch control member (3) slides to the right in an axial direction, the edge (42) of the clutch control member (3) pushes the stop bolt (1) inward. Confined and guided by the clutch control member (3), the stop bolt (1) retreats into the internal clutch stem (2) to the position shown in FIG. 8. The clutch casing (4) turns clockwise without being stopped by the stop bolt (1). Thus, it fails to turn the internal clutch stem (2) to unlock. As shown in FIG. 9, the clutch device stays in a separated state and the clutch casing (4) turns counter- clockwise to reset itself in the initial position after the locking turn, as shown in FIG. 10.

Figure 2:
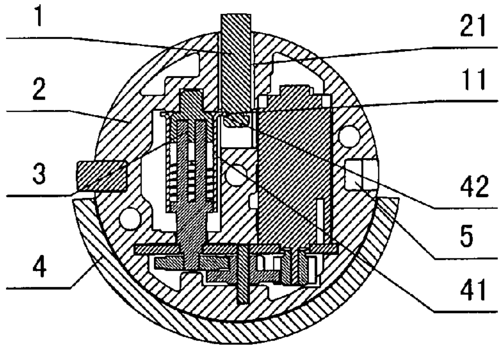
FIG. 2 is a structural diagram of a clutch and reverse-locking device of the present invention for a left-open door.

FIG. 2 shows a clutch and reverse-locking device for a left-open door. Its operation principle is the same as that of the device for a right-open door except for the opposite rotation direction.

Figure 11:
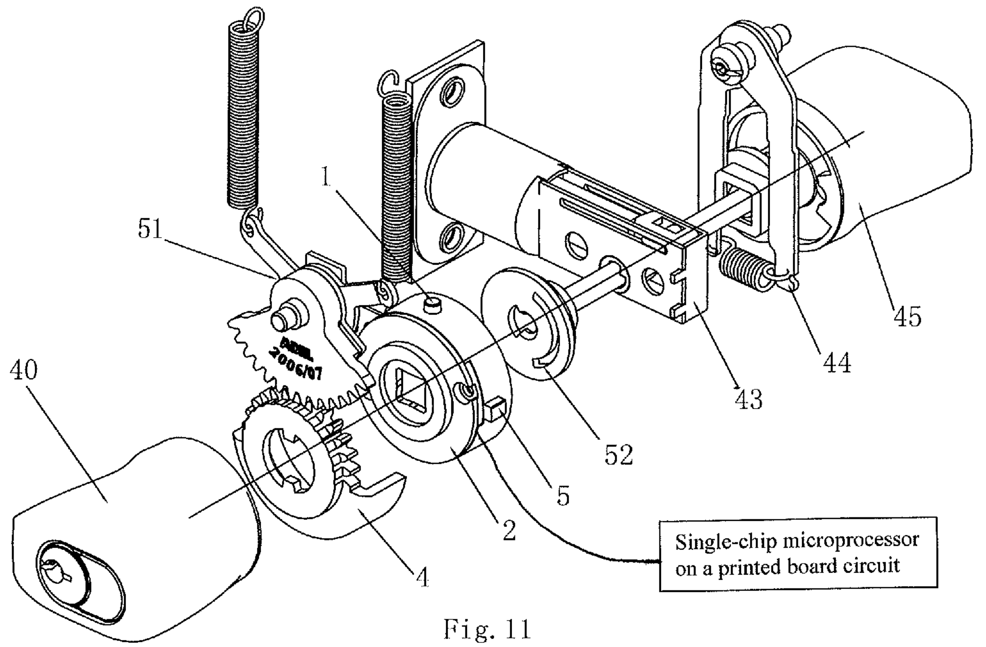
FIGS. 11-12 are exploded views of the device of the present invention being assembled in a lock system.
Figure 12:
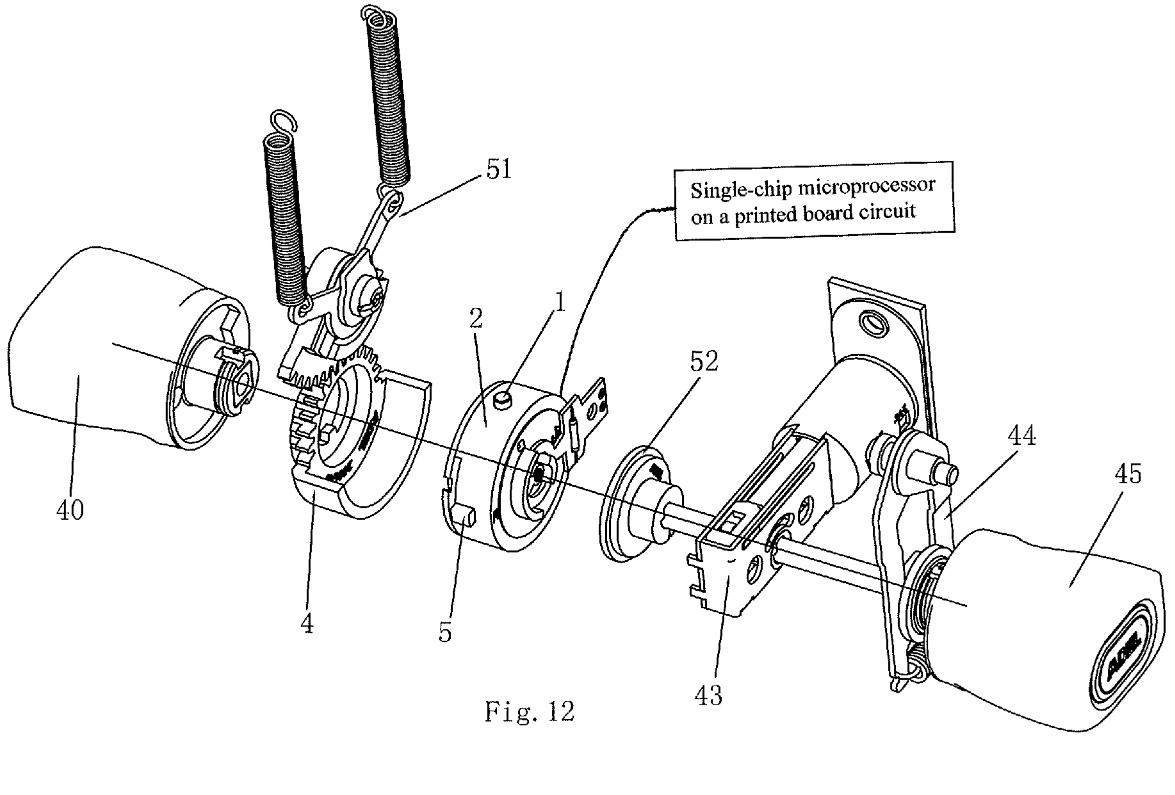

FIGS. 11-12 show the clutch and reverse-locking device being used in a lock system. During operation, the rotation of the front knob (40) located outside of the door causes the rotation of the clutch casing (4) since they are fixedly amounted to each other along the same axis. The rotation of the clutch casing (4) achieves the locking and unlocking functions as described above and shown in FIGS. 1-10. The retreat or extrusion of the stop bolt (1) is controlled by a single-chip microprocessor mechanism on a printed board circuit and coordinated with the rotation of the clutch casing (4). When stop bolt (1) stretches out from clutch stem (2), the clutch opens as a result of the clutch casing (4) rotates with the stop bolt (1) and clutch stem (2). When the stop bolt (1) shrinks into clutch stem (2), the clutch locked as the result of the clutch casing cannot rotate with stop bolt (1) and clutch stem (2). A gear set for motor can be set at the edge of the stopper (5) with the motor spindle adjoins the gear set. As a chain reaction, when the motor spindle rotates, the gear set rotates, the stopper (5) rotates, and the clutch control member (3) rotates. The rotation and the stoppage of the motor can be controlled by the microprocessor on the printed board circuit. The reset device (51) for the front knob (40) resiliently retains the front knob (40) in its initial position. The same is true of the reset device (44) of the rear knob (45) located inside the door. The rotation of the front knob (40), the clutch casing (4) and the internal clutch stem (2) causes the rotation of the shaft and connection member (52), which activates the deadbolt (43) to lock or unlock the door. Similarly, the rotation of the rear knob (45) also causes the rotation of the shaft and connection member (52) and activates the deadbolt (43) to lock or unlock the door from inside.

The invention claimed is:

1. A clutch and reverse-locking device comprising a stop bolt, an internal clutch stem, a clutch control member, a clutch casing, a stopper, and a single-chip microprocessor mechanism on a printed board circuit, wherein the internal clutch stem is inserted into the clutch casing, and the internal clutch stem and the clutch casing move independently of each other; the internal clutch stem has a slot to house and guide the stop bolt; the clutch control member is installed in the internal clutch stem and has an edge engaging a groove in the stop bolt; and the stopper is fitted in the internal clutch stem and protrudes partially outward therefrom, wherein a transmission sleeve in the clutch control member can slide in an axial direction of the transmission sleeve; and the transmission sleeve is confined and guided by the clutch control member, and wherein the mircroprocessor mechanism controls the retreat or extrusion of the stop bolt in coordination with the rotation of the clutch casing.

* * * * *